United States Patent
Kuth et al.

(10) Patent No.: US 7,724,931 B2
(45) Date of Patent: May 25, 2010

(54) METHOD AND APPARATUS FOR EVALUATING A 3D IMAGE OF A LATERALLY-SYMMETRIC ORGAN SYSTEM

(75) Inventors: Rainer Kuth, Höchstadt (DE); Sebastian Schmidt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 869 days.

(21) Appl. No.: 11/593,884

(22) Filed: Nov. 7, 2006

(65) Prior Publication Data

US 2007/0161886 A1 Jul. 12, 2007

(30) Foreign Application Priority Data

Nov. 7, 2005 (DE) ............ 10 2005 052 993

(51) Int. Cl.
*G06K 9/00* (2006.01)
*G06K 9/46* (2006.01)
*A61B 5/05* (2006.01)

(52) U.S. Cl. ............... 382/128; 382/154; 382/203; 600/407

(58) Field of Classification Search ......... 382/128–132, 382/154, 203; 600/407
See application file for complete search history.

(56) References Cited

U.S. PATENT DOCUMENTS

| | | | | |
|---|---|---|---|---|
| 5,148,477 A * | 9/1992 | Neely et al. | ............ | 382/107 |
| 5,214,711 A * | 5/1993 | Neely et al. | ............ | 382/107 |
| 6,175,614 B1 * | 1/2001 | Jensen et al. | ............ | 378/98.7 |
| 6,181,768 B1 * | 1/2001 | Berliner | ............ | 378/41 |
| 6,633,655 B1 * | 10/2003 | Hong et al. | ............ | 382/118 |
| 6,895,103 B2 * | 5/2005 | Chen et al. | ............ | 382/117 |
| 2001/0053240 A1 * | 12/2001 | Oosawa | ............ | 382/128 |
| 2002/0196965 A1 * | 12/2002 | Wallace et al. | ............ | 382/131 |
| 2005/0041867 A1 * | 2/2005 | Loy et al. | ............ | 382/190 |
| 2005/0148852 A1 | 7/2005 | Tank | | |
| 2005/0190189 A1 | 9/2005 | Chefd'hotel et al. | | |
| 2005/0283070 A1 * | 12/2005 | Imielinska et al. | ............ | 600/425 |
| 2007/0173815 A1 * | 7/2007 | Murase | ............ | 606/53 |
| 2008/0025646 A1 * | 1/2008 | Aguera y Arcas et al. | ... | 382/305 |
| 2008/0278481 A1 * | 11/2008 | Aguera y Arcas et al. | ... | 345/419 |

FOREIGN PATENT DOCUMENTS

DE 199 20 300 A1 11/2000
DE 10 2004 044 433 A1 1/2006

* cited by examiner

*Primary Examiner*—Aaron W Carter
(74) *Attorney, Agent, or Firm*—Schiff Hardin LLP

(57) ABSTRACT

In a method for automated evaluation of a three-dimensional map of a laterally-symmetric organ system as well as medical image acquisition system and a computer program for this purpose, a three-dimensional image of the organ system is segmented, and the segmented organ system is deformed such that the deformed organ system has two mirror-symmetric halves with regard to its external shape. The differences between both mirror-symmetrical halves of the deformed organ system are determined by a comparison of one half with the other half. Alternatively, instead of the deformation of the segmented organ system a mirror-symmetric normal model of the organ system can be deformed, relative to the organ system, or vice versa, such that differences of corresponding regions of both halves of the organ system can be determined using the normal model. The determined differences are presented to a user.

31 Claims, 3 Drawing Sheets

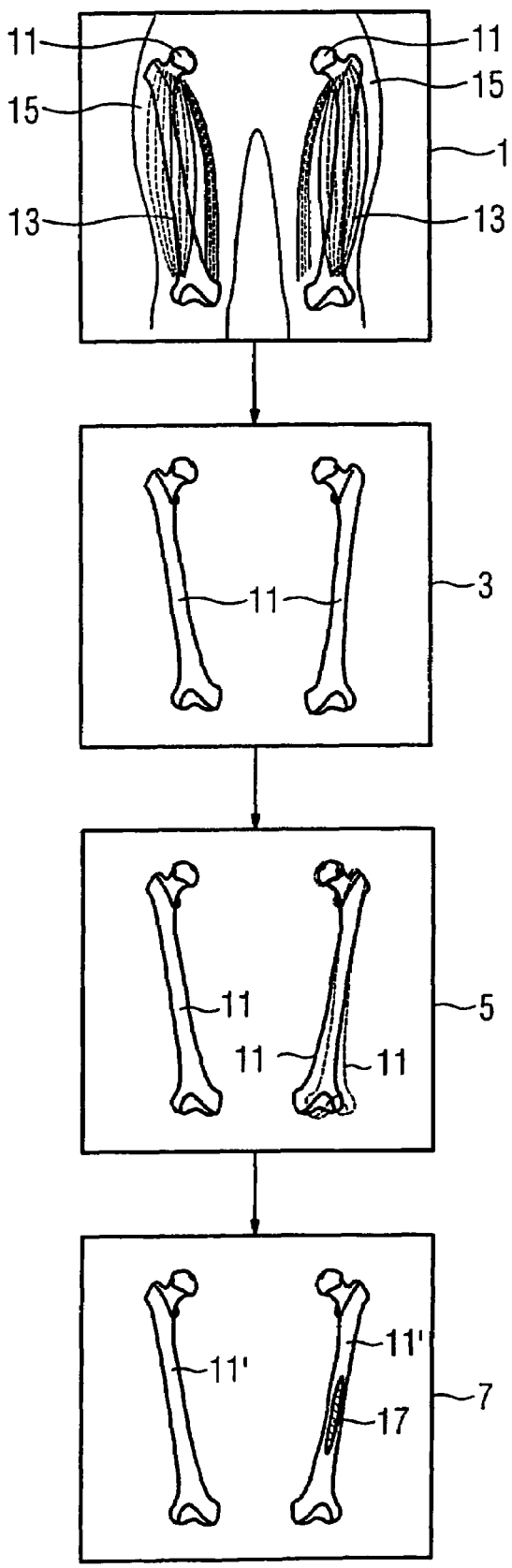

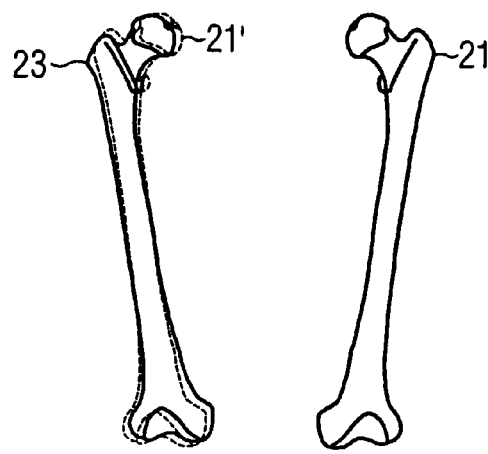
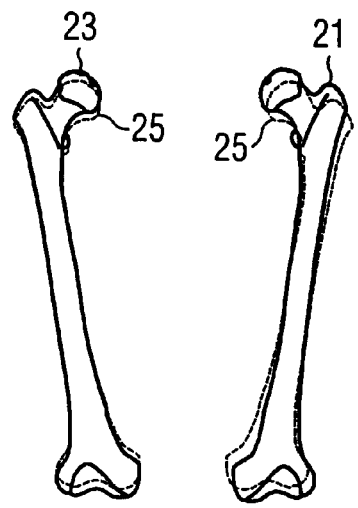
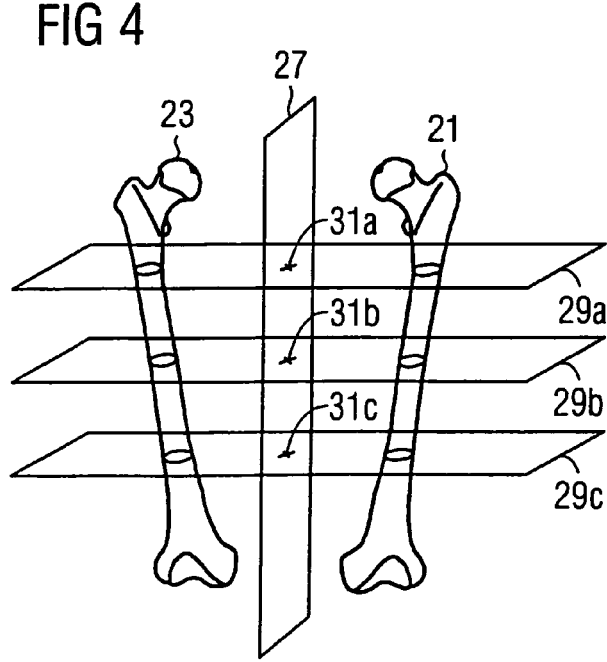
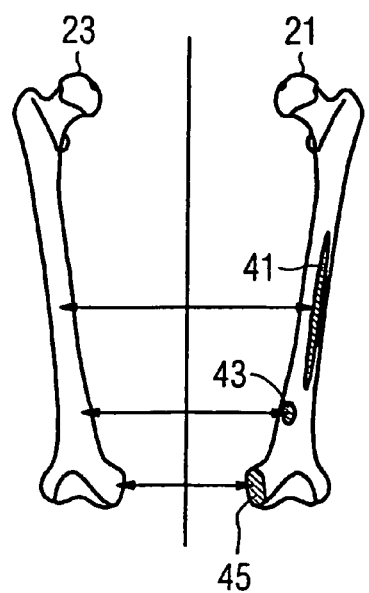

METHOD AND APPARATUS FOR EVALUATING A 3D IMAGE OF A LATERALLY-SYMMETRIC ORGAN SYSTEM

BACKGROUND OF THE INVENTION

1. Field of the Invention

The present invention concerns a method for automated evaluation of a three-dimensional image of a laterally-symmetric organ system as well as a medical image data acquisition system and a computer program for this purpose.

2. Description of the Prior Art

Data acquisition methods in which a three-dimensional data set or image of organ systems of a patient to be examined is produced are well known in medical imaging due to the exceptional diagnostic possibilities. The methods employed (such as, for example, computed tomography or magnetic resonance tomography) generate large data sets. For example, modern computed tomography systems produce dozens of slice image exposures in a few hundred milliseconds. The large number of exposures that arise can often be evaluated by a radiologist only with a very large expenditure of time. The risk of overlooking findings increases given the evaluation of large data sets.

For the evaluation of laterally-symmetric organs situated in a laterally-symmetrical manner, it is helpful and often even necessary for the radiologist to analyze both sides of the organ in comparison with one another. Often only a laterally different assessment indicates pathologies or (in the reverse case) an apparently suspect finding in one half of the organ system turns out to be a harmless normal variant when it also occurs in the other half of the organ system.

Large data sets must also be evaluated in for oncological questions, since often the entire body of the patient, or at least large portions thereof, are to be scanned for indicative of metastasy lesions. A typical example is plasmocytoma, which can manifest at many points of the skeleton. Laterally-different findings here are considered as particularly suspect with regard to a possible metastasy As a result, there exists a need for automatic evaluation methods that support the user (in particular the radiologist) by marking suspect points to which the user subsequently directs his or her attention.

A method for automatic generation of result images of an examination subject using slice image data is disclosed in DE 103 57 205 A1 and in the corresponding US 2005/14852 A1. A target structure is initially determined dependent on a diagnostic question and an anatomical normal model, the geometry of which can be varied using the model parameters, is automatically adapted to the target structure. A segmentation ensues from which the adapted normal model and relevant anatomical structures of the examination subject are separated with regard to the relevant diagnostic question, by such structures being identified with the aid of the normal model. The relevant anatomical structures are subsequently separately visualized and/or stored for a later visualization.

DE 199 20 300 A1 discloses a method for tracking pathological variations in the human body using magnetic resonance scanners, wherein a 3D image data set is automatically compared with old image data sets of the same patient and/or with anatomical atlases for determination of pathological variations.

SUMMARY OF THE INVENTION object of the present invention to provide a method with which the evaluation of a three-dimensional image of a laterally-symmetric organ system is automated in large part, in particular for automatic detection of laterally-different findings. Furthermore, it is the object of the invention to provide a medical image acquisition system and a computer program with which the evaluation of a three-dimensional image of a laterally-symmetric organ system is automated in large part, in particular for automatic detection of laterally-different findings, such that the user is supported in an effective manner.

The above object is achieved in accordance with the invention by a method for evaluation of a three-dimensional image of a laterally-symmetric organ system including segmentation of the organ system in the three-dimensional image deformation of the segmented organ system such that the deformed organ system exhibits mirror-symmetric halves with regard to its external shape, determination of differences between both mirror-symmetric halves of the deformed organ system using a comparison of one half with the other half, and representation of the determined differences.

Using this method the organ system in the three-dimensional image is segmented in a first step in order to obtain a shape of the organ system. The segmented, laterally-symmetric organ system is in fact already largely mirror-symmetric; but, both halves of the organ system cannot be subjected to a direct comparison since, due to natural lateral variations, both halves are congruent with regard to their shape only in rare cases. For example, the spinal column is askew given a slight scoliosis such that, although it is situated laterally-symmetrically in principle, in this specific case it is not mirror-symmetric.

In a second method step a deformation of the segment organ system ensues such that the organ system exhibits two halves that are mirror-symmetrical with regard to their shape. Such a deformation can ensue using algorithms known as non-rigid registration algorithms ("non-rigid registration") as described for example, in US 2005/0190189 A1.

Since, after the deformation, the organ system has two halves that are mirror-symmetrical with regard to shape, in a third method step a comparison of both halves of the deformed organ system can be implemented in a simple manner. Differences between both halves are identified by the comparison of both halves and these differences are presented to a user. The user can now direct his or her attention to the determined differences such that this method supports the user in the assessment of the image.

In an embodiment, the deformation of the segmented organ system ensues by mirroring and deforming one of the two halves of the segmented organ system such that it corresponds to the other half with regard to its external shape. In another embodiment, the deformation of the segmented organ system ensues by mirroring one of the two halves of the segmented organ system and deforming the other half such that it corresponds to the mirrored half with regard to its external shape. Both embodiments have the advantage that only one half of the segmented organ system is deformed, such that computation time is spared.

The mirroring of one half of the segmented organ system can ensue such that a mirror plane, with respect to which the mirroring is conducted, is automatically determined.

In a preferred embodiment the mirror plane is determined by extraction of two-dimensional slice images from the image of the organ system, determination of surface focal points of the two-dimensional slice images, and determination of the mirror plane using the surface focal points.

This embodiment has the advantage that the organ system exhibits a predominant symmetry with regard to the mirror plane so determined. The step in which one of the two halves is deformed such that it coincided in terms of its shape with the other half can be fashioned in a simpler manner because possible rotations and translations no longer have to be taken into account (or at least must only be taken into account to a very small degree) before a deformation.

In a further embodiment the deformation of the segmented organ system ensues on a mirror-symmetrical normal model of the organ system. Such a normal model can be created, for example, from a large group of patients, such that an actually-imaged organ system already largely corresponds to the normal model. A mirroring of one half of the organ system is not necessary in this embodiment.

In this embodiment, the evaluation of a three-dimensional map of a laterally-symmetric organ system proceeds by segmenting the organ system in the three-dimensional image, deformation of a mirror-symmetric normal model of the organ system with adaptation (adjustment; approximation) of the mirror-symmetric normal model to the organ system, determination of differences between both halves of the organ system using a comparison of corresponding regions of both halves of the organ system, with the corresponding regions being determined using the deformed normal model, and representation of the determined differences.

In this embodiment the organ system itself is not deformed but instead a mirror-symmetrical normal model is deformed to the organ system. In that the undeformed normal model is mirror-symmetric, regions of the normal model corresponding with regard to mirror symmetry are known. These corresponding regions are likewise deformed by the deformation of the normal model and now serve to determine corresponding regions in the organ system. The differences between the halves of the organ system thus can be determined in a simple manner.

Both embodiments, with and without the use of the model, are based on the insight that a comparison between both halves is possible only when the corresponding regions are known and identified in both halves. This is achieved in one embodiment by the deformation of the image of the organ system, in the other embodiment by the deformation of a mirror-symmetric normal model.

In an embodiment of the method, the determination of the differences ensues by a comparison of corresponding voxels (in particular their signal strengths) of one half and the other half. Differences between both halves can thereby be determined at corresponding resolution in one of the voxels. In addition to a graphical representation, the data that have been acquired from the voxel-by-voxel comparison of both halves are stored in a computer unit and evaluated elsewhere. For example, a value can be determined that quantitatively characterizes the difference between both halves.

In another embodiment of the method, the representation of the differences between the two halves ensues in the form of a subtraction image. In the subtraction image one half of the deformed organ system is subtracted from the other, mirrored half. Laterally different findings can be represented particularly clearly in this manner since laterally-identical findings are cancelled in the image by subtraction.

In another embodiment of the method, the representation of the differences ensues in an image in that regions with differences between both halves are separately characterized in the representation. Regions with differences between both halves are preferably color-coded corresponding to the significance of the differences. In this manner a radiologist can immediately recognize in which regions laterally-different findings occur.

In a preferred embodiment for the representation, the characterization of the regions with differences ensues dependent on a threshold, so only those regions of the organ system are identified that exhibit differences greater than the threshold. In this manner, smaller laterally-different findings that are based on a natural lateral variation, and therefore are not strongly pronounced, can be masked. The threshold in the representation preferably can be interactively changed by a user.

In a further embodiment of the method, the threshold is a variable threshold, the value of which varies depending on location in the organ system. In this manner a difference of a certain significance that is to be assessed as non-pathological (due to non-physiological processes) in a specific region of the organ system can also be evaluated and represented differently from a difference of the same significance that is, however, to be assessed as pathological in a different region of the organ. For example, in a right-handed individual the bones of the right and the left hand can exhibit distinctly greater physiological differences (due to the different usage of both hands) than, for example, the upper arm bones. This can be taken into account by the variable threshold.

In a further embodiment, regions with the smallest and/or greatest differences can be separately identified in the representation.

The three-dimensional image can be acquired by means of magnetic resonance tomography, computed tomography, ultrasound imaging or optical tomography.

The above object also is achieved by a medical image acquisition system having a computer that is programmed to implement the method and all of its embodiments described above.

The above object also is achieved by a computer program (computer-readable medium encoded with a data structure) that, when loaded into a computer of a medical image acquisition system, causes the medical image acquisition system to implement the method and all of its embodiments described above.

DESCRIPTION OF THE DRAWINGS

FIG. 1 schematically illustrates the basic steps of the inventive method in an example of an image of the femur.

FIG. 2 illustrates an embodiment of the deformation of the femur to acquire two mirror-symmetrical image halves.

FIG. 3 illustrates a further embodiment of the deformation of the femur to acquire two mirror-symmetric image halves.

FIG. 4 illustrates the method for acquisition of a plane of symmetry relative to which the organ system is essentially mirror-symmetric.

FIG. 5 illustrates the comparison of two mirror-symmetric halves.

DESCRIPTION OF THE PREFERRED EMBODIMENTS

Figure 6:
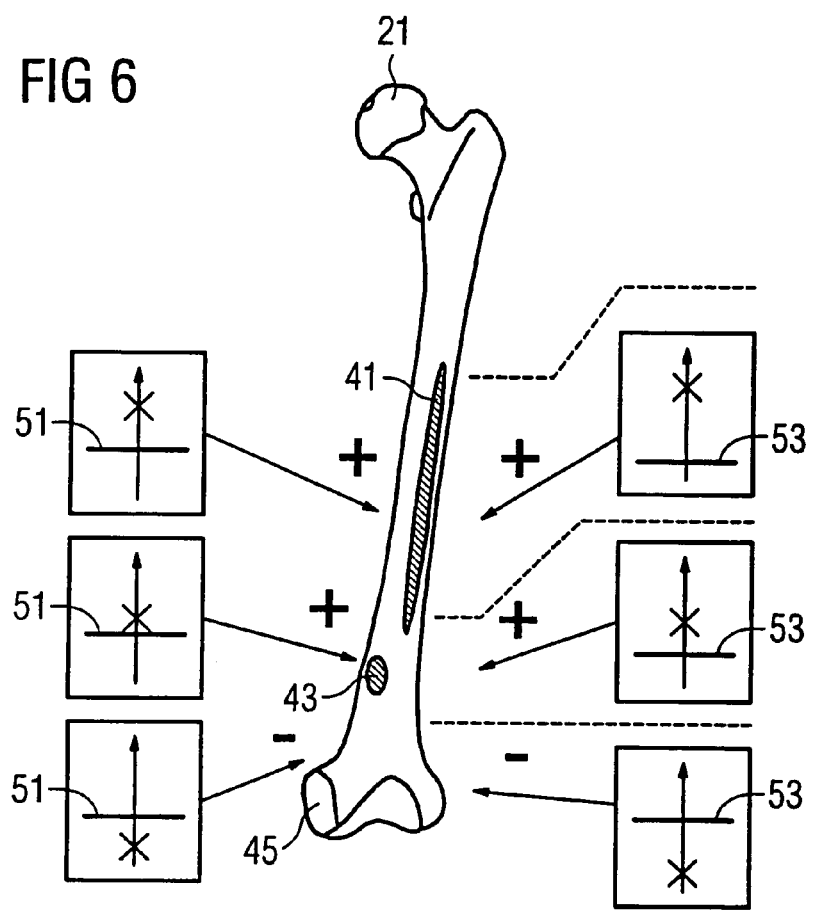
FIG. 6 through FIG. 8 respectfully illustrate various ways of representing the obtained result.

FIG. 1 schematically shows the basic method steps that are used in the evaluation of laterally-symmetrically situated organ systems. The exemplary embodiment explained in FIG. 1 is demonstrated on a portion of the skeletal system (more precisely on the femur 11), but functions in an analogous manner for all laterally-symmetrically situated organ systems such as, for example, the brain or musculature, and even when the organ is in fact laterally symmetrical but is not paired (such as, for example, the spinal column). It is the goal of the method to implement an automatic evaluation of the organ system with regard to laterally-different findings. Laterally-different findings are of central importance, for example, in the context of oncological questions since they provide indications of possible metastasization of a tumor and thus indicate possible progress of the illness necessitating therapy.

The starting point of the method is a three-dimensional image 1 of the laterally-symmetrically situated organ system, in this case both femurs 11. In addition to the organ structure to be evaluated (the femurs 11), this image also contains further organs and tissue types such as, for example, the musculature 13 and fatty tissue 15. In a first method step 3 the femurs 11 to be examined are segmented from the image in order to separate the femurs 11 from structures that are not significant for the evaluation. Due the segmentation, the laterally-symmetrically situated femurs 11 are shown separate from other structures such as the musculature 13 and the fatty tissue 15.

Although both femurs 11 are situated laterally-symmetrically, a perfect lateral symmetry does not occur in nature. In a second method step 5 the femurs 11 therefore are deformed such that the deformed femurs 11' have two mirror-symmetrical halves coinciding in terms of their outer shape.

In a third method step 7 laterally-different differences 17 can now be established in a simple manner using both deformed halves. The differences. 17 are marked and presented to a user, for example a radiologist.

FIG. 2 and FIG. 3 show possible embodiments of the deformation of the image of the femurs 21, 23; the image of the femurs 21, 23 thus has two mirror-symmetrical halves coinciding in terms of their outer shape.

In FIG. 2 it can be seen that the mirrored right femur 21' does not completely coincide with the left femur 23. In order to compensate for this lateral difference, the left femur 23 is deformed by means of algorithms known as a non-rigid registration algorithms ("non-rigid registration") as are described, for example, in US 2005/0190189 A1 and is adapted to the mirrored right femur 21'. The left femur 21 thus coincides in terms of its external shape with the right femur 23. Laterally-different findings thus can be detected in a simple manner by a comparison of the right femur 21 with the deformed left femur.

In the example shown here the left femur 23 is deformed in order to match-its shape with the mirrored right femur 21'. The mirrored right femur 21' can likewise also be deformed so that a correlation is achieved.

Both femurs 21, 23 are adapted to a mirror-symmetrical normal model in FIG. 3. The adaptation preferably also ensues by means of a non-rigid registration. Because both femurs 21, 23 are deformed corresponding to the normal model 25, they are mirror-symmetric in terms of their external shape. Differences in the bone structure can now be detected in a simple manner by a comparison of both halves.

The normal model 25 shown in FIG. 3 can also be used in other embodiment variants of the invention. Here the femurs 21, 23 are not deformed to the normal model, rather the reverse. Because corresponding, mirror-symmetric regions in the un-deformed normal model 25 are known, corresponding regions in the deformed normal model are likewise known, and therewith also corresponding regions of both femurs 21, 23.

The method step with which a plane of symmetry is found with regard to the organ system is described in FIG. 4. Using this plane of symmetry, the mirroring of the one half on the other, half ensues is achieved in an optimally congruent manner. The deformation algorithms thus can be designed more simply since only more non-rigid deformations must be taken into account. Possible translations or rotations only have to be implemented to a very small degree, if at all, before application of the algorithms.

Use is made of the fact that both femurs 21, 23 are essentially presented symmetrically in slice images that are produced perpendicular to the plane of symmetry 27 of both bones 21, 23. Slice images 29a, 29b, 29c that are produced in the transversal plane and in the frontal plane (not shown here) are essentially symmetrical in both femurs 21, 23 that are situated with lateral symmetry with regard to the sagittal plane.

A surface focal point 31a, 31b, 31c is determined in each of these slice images 29a, 29b, 29c. A plane 27 is subsequently placed through the surface focal points 31a, 31b, 31c such that the sum of the squares of the intervals of the surface focal points 31a, 31b, 31c relative to the plane 27 is minimized. The two femurs 21, 23 already exhibit a high degree of symmetry relative to the plane 27 so obtained, such that only multiple small corrections of the slightly laterally-different shapes must be implemented using algorithms (noted above) to obtain a complete mirror symmetry.

After both femurs 21, 23 have been deformed such that they are mirror-symmetrical in terms of their external shape, a comparison of both sides can be conducted. This is shown in FIG. 5. The comparison of both sides can ensue voxel-by-voxel or also by a comparison of larger regions. Laterally-different findings such as, for example, lesions 41, 43 caused by metastases (here localized in the bone shaft) or stress-induced differences 45 (here in the distal bone projection) are thus detected and can thereupon be presented to the user.

Figure 7:
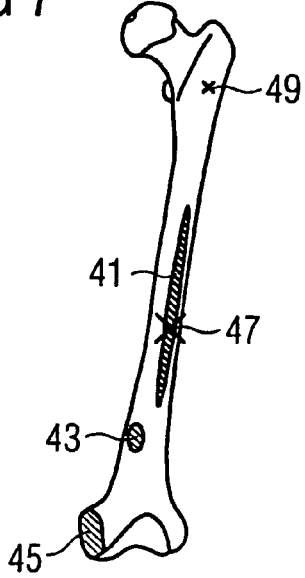
Figure 8:
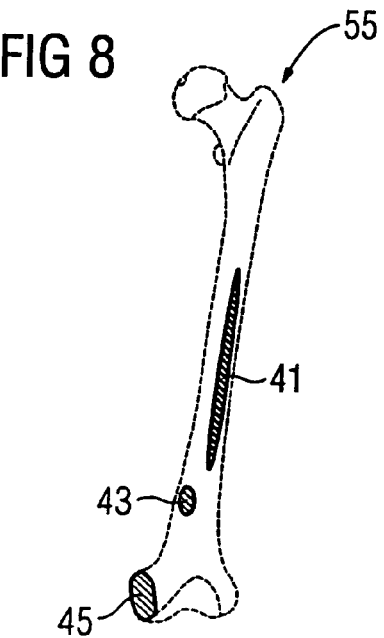

FIGS. 6 through 8 show possible forms of the visualization of the differences. In FIG. 6 the laterally-different findings are only shown separately marked when their difference lies above a determined threshold 51. In the example shown here, this is the case for the metastasis-typical lesions 41, 43 in the region of the bone shaft, while the load-induced difference 45 in the distal bone projection is so slight that it lies below the threshold 51 and thus is not separately marked.

The threshold 51 schematically shown in FIG. 6 can also be fashioned as a variable threshold 53, so the threshold 53 assumes a different value dependent on the location in the organ system. For the femur 21 shown here it is, for example, advantageous to select the threshold 53 larger in the region of the distal bone projections than in the region of the bone shaft. If a person has a different usage of the right leg and the left leg for ambulation and support, a larger physiological difference can be present, for example, in the region of the distal bone projections (induced by different stresses) than in the region of the bone shaft. This fact can be taken into account by the variably-fashioned threshold 53.

FIG. 7 shows a further possible representation of the laterally-different findings in which differences are shown color-coded depending on their significance. In this representation, regions are additionally separately identified that exhibit the greatest difference 47 and the smallest difference 49.

In another embodiment, a user (not shown) can interactively change the threshold 51 for the observation of the representation. The user can thereby establish in a simple manner at which threshold 51 differences between the two sides are relevant.

FIG. 8 shows a further possible representation of the laterally-different findings by a subtraction technique. In the subtraction technique a mirrored half of the deformed organ system is subtracted from the other half, such that laterally-identical findings in the subtraction image 55 mutually cancel and differences clearly appear in the representation.

Although modifications and changes may be suggested by those skilled in the art, it is the intention of the inventors to embody within the patent warranted hereon all changes and modifications as reasonably and properly come within the scope of their contribution to the art.

We claim:

1. A method for evaluating a three-dimensional image of a laterally-symmetric organ system, comprising the steps of:
    electronically segmenting a three-dimensional image of a laterally symmetric organ system, to obtain a segmented organ system;
    electronically deforming said segment organ system to produce an electronically deformed organ system comprising two halves that are mirror-symmetrical with regard to their external shape;
    electronically determining differences between said mirror-symmetric halves of the deformed organ system by comparing one of said halves with the other of said halves; and
    visually representing the determined differences between said halves.

2. A method as claimed in claim 1 wherein the step of electronically deforming the segmented organ system comprises electronically mirroring one of the two halves of the segmented organ system and deforming the mirrored half to cause the mirrored half to correspond with the other of said halves with regard to said external shape.

3. A method as claimed in claim 2 comprising mirroring one of said two halves with respect to an automatically-determined mirror plane.

4. A method as claimed in claim 3 comprising automatically determining said mirror plane by:
    extracting two-dimensional slice images from said three-dimensional image of said organ system;
    determining surface focal points of the respective two-dimensional slices images; and
    determining said mirror plane using said surface focal points.

5. A method as claimed in claim 1 wherein the step of electronically deforming the segmented organ system comprises mirroring one of the two halves of the segmented organ system, and deforming the other of said two halves to correspond to the mirrored half with regard to said external shape.

6. A method as claimed in claim 5 comprising mirroring one of said two halves with respect to an automatically-determined mirror plane.

7. A method as claimed in claim 6 comprising automatically determining said mirror plane by:
    extracting two-dimensional slice images from said three-dimensional image of said organ system;
    determining surface focal points of the respective two-dimensional slices images; and
    determining said mirror plane using said surface focal points.

8. A method as claimed in claim 1 wherein the step of electronically deforming the segmented organ system comprises obtaining a mirror-symmetric normal model of the organ system and deforming the segmented organ system by adapting the segmented organ system to said mirror symmetric normal model.

9. A method as claimed in claim 1 wherein each of said mirror symmetric halves of the deformed organ system is comprised of voxels, and wherein the step of determining the differences comprises electronically comparing corresponding voxels of one of said halves with the other of said halves.

10. A method as claimed in claim 1 wherein the step of representing said differences comprises representing said differences as a subtraction image.

11. A method as claimed in claim 1 wherein the step of representing said differences comprises separately identifying said differences and differently representing the separate differences.

12. A method as claimed in claim 11 comprising separately representing said differences by differently color-coding the separate differences.

13. A method as claimed in claim 11 comprising separately identifying said differences dependent on a threshold with only regions of the organ system having differences exceeding said threshold being represented.

14. A method as claimed in claim 13 comprising allowing manual modification of said threshold.

15. A method as claimed in claim 13 comprising employing a variable threshold as said threshold, said variable threshold having a value that varies dependent on a location in the organ system.

16. A method as claimed in claim 11 comprising separately identifying at least one of regions exhibiting a smallest difference and regions exhibiting a greatest difference.

17. A method as claimed in claim 1 comprising acquiring three-dimensional image using an imaging modality selected from the group consisting of magnetic resonance tomography, x-ray computed tomography, ultrasound imaging, and optical tomography.

18. A method for evaluating a three-dimensional image of a laterally-symmetrical organ system, comprising:
    electronically segmenting the organ system in the three-dimensional image;
    electronically deforming a mirror-symmetrical normal model of said organ system by adapting the mirror-symmetrical normal model to said organ system in said three-dimensional image;
    electronically determining corresponding regions of respective halves of the organ system using the deformed normal model, and electronically determining differences between the respective halves of the organ system by comparing said corresponding regions of the respective halves; and
    visually representing the determined differences.

19. A method as claimed in claim 18 wherein each of said mirror symmetric halves of the deformed organ system is comprised of voxels, and wherein the step of determining the differences comprises electronically comparing corresponding voxels of one of said halves with the other of said halves.

20. A method as claimed in claim 18 wherein the step of representing said differences comprises representing said differences as a subtraction image.

21. A method as claimed in claim 18 wherein the step of representing said differences comprises separately identifying said differences and differently representing the separate differences.

22. A method as claimed in claim 21 comprising separately representing said differences by differently color-coding the separate differences.

23. A method as claimed in claim 21 comprising separately identifying said differences dependent on a threshold with only regions of the organ system having differences exceeding said threshold being represented.

24. A method as claimed in claim 23 comprising allowing manual modification of said threshold.

25. A method as claimed in claim 23 comprising employing a variable threshold as said threshold, said variable threshold having a value that varies dependent on a location in the organ system.

26. A method as claimed in claim 21 comprising separately identifying at least one of regions exhibiting a smallest difference and regions exhibiting a greatest difference.

27. A method as claimed in claim 18 comprising acquiring three-dimensional image using an imaging modality selected from the group consisting of magnetic resonance tomography, x-ray computed tomography, ultrasound imaging, and optical tomography.

28. A system for evaluating a three-dimensional image of a laterally-symmetric organ system, comprising:

a processor that segments a three-dimensional image of a laterally symmetric organ system, to obtain a segmented organ system, and deforms said segment organ system to produce an electronically deformed organ system comprising two halves that are mirror-symmetrical with regard to their external shape, and determines differences between said mirror-symmetric halves of the deformed organ system by comparing one of said halves with the other of said halves; and a display connected to said processor that visually represents the determined differences between said halves.

29. A system for evaluating a three-dimensional image of a laterally-symmetrical organ system, comprising:

a processor that segments the organ system in the three-dimensional image, and deforms a mirror-symmetrical normal model of said organ system by adapting the mirror-symmetrical normal model to said organ system in said three-dimensional image, and determines corresponding regions of respective halves of the organ system using the deformed normal model, and electronically determining differences between the respective halves of the organ system by comparing said corresponding regions of the respective halves; and a display connected to said processor that visually represents the determined differences.

30. A computer-readable medium encoded with a data structure for evaluating a three-dimensional image of a laterally-symmetric organ system, said medium being loadable into a processor and said data structure programming said processor to:

segment a three-dimensional image of a laterally symmetric organ system, to obtain a segmented organ system;

deform said segment organ system to produce an electronically deformed organ system comprising two halves that are mirror-symmetrical with regard to their external shape;

determine differences between said mirror-symmetric halves of the deformed organ system by comparing one of said halves with the other of said halves; and cause the determined differences between said halves to be visually displayed.

31. A computer-readable medium encoded with a data structure for evaluating a three-dimensional image of a laterally-symmetrical organ system, said medium being loadable into a processor and said data structure programming said processor to:

segment the organ system in the three-dimensional image;

deform a mirror-symmetrical normal model of said organ system by adapting the mirror-symmetrical normal model to said organ system in said three-dimensional image;

determine corresponding regions of respective halves of the organ system using the deformed normal model, and electronically determining differences between the respective halves of the organ system by comparing said corresponding regions of the respective halves; and cause the determined differences to be visually displayed.

* * * * *